US012203828B2

(12) United States Patent
Downey et al.

(10) Patent No.: US 12,203,828 B2
(45) Date of Patent: Jan. 21, 2025

(54) METHOD AND SYSTEM FOR DETECTING ANOMALIES IN A SEMICONDUCTOR PROCESSING SYSTEM

(71) Applicant: Applied Materials, Inc., Santa Clara, CA (US)

(72) Inventors: Ryan T. Downey, San Jose, CA (US); Hemant P. Mungekar, Campbell, CA (US); James L'Heureux, Santa Clara, CA (US); Andreas Neuber, Stuttgart (DE); Michael W. Johnson, Austin, TX (US); Joseph A. Van Gompel, Austin, TX (US); Gino Gerardo Crispieri, Austin, TX (US); Tony H. Tong, Dublin, CA (US); Maxime Cayer, Chandler, AZ (US); John L Koenig, Cedar Park, TX (US); Mike M. Huang, Hsinchu (TW)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/240,677

(22) Filed: Apr. 26, 2021

(65) Prior Publication Data
US 2022/0341821 A1 Oct. 27, 2022

(51) Int. Cl.
G01M 99/00 (2011.01)
(52) U.S. Cl.
CPC .................................. *G01M 99/008* (2013.01)
(58) Field of Classification Search
CPC ..................... G01M 99/008; G05B 19/042
See application file for complete search history.

(56) References Cited

U.S. PATENT DOCUMENTS

| 5,740,429 A | * | 4/1998 | Wang | G06Q 10/06 |
| 6,952,656 B1 | * | 10/2005 | Cordova | G05B 19/042 |
| | | | | 700/121 |
| 2008/0109185 A1 | * | 5/2008 | Cheung | G05B 23/0283 |
| | | | | 702/184 |

OTHER PUBLICATIONS

Shaun Crawford et al., Integrating Subfab into Fab Automation for Smart Manufacturing, APC 2019, San Antonio, Oct. 28-31, 2019, 23 pages.

(Continued)

*Primary Examiner* — Matthew G Marini
*Assistant Examiner* — Leo T Hinze
(74) *Attorney, Agent, or Firm* — Patterson + Sheridan, LLP

(57) ABSTRACT

The present disclosure relates to systems and methods for detecting anomalies in a semiconductor processing system. According to certain embodiments, one or more external sensors are mounted to a sub-fab component, communicating with the processing system via a communication channel different than a communication channel utilized by the sub-fab component and providing extrinsic sensor data that the sub-fab component is not configured to provide. The extrinsic sensor data may be combined with sensor data from a processing tool of the system and/or intrinsic sensor data of the sub-fab component to form virtual sensor data. In the event the virtual data exceeds or falls below a threshold, an intervention or a maintenance signal is dispatched, and in certain embodiments, an intervention or maintenance action is taken by the system.

14 Claims, 5 Drawing Sheets

(56) References Cited

OTHER PUBLICATIONS

Andreas Neuber, et al., iSystem as Subfab Automation Platform for Industry 4.0 & Smart Manufacturing, Semicon West, Jul. 9-11, 2019, 20.
Hemant P. Mungekar Ph.D., et al., An Industry 4.0 Implementation of Subfab, 19 European APC | M Conference, Villach, Austria 2019, 12 pages.

* cited by examiner

METHOD AND SYSTEM FOR DETECTING ANOMALIES IN A SEMICONDUCTOR PROCESSING SYSTEM

BACKGROUND

Field

Embodiments of the present invention generally relate to the augmentation of semiconductor processing systems with data sources, and more particularly to augmenting sub-fab components with additional sensors.

Description of the Related Art

Semiconductor processing systems are typically made up of numerous systems orchestrated by one or more computer systems. The semiconductor processing tool typically includes one or more processing chambers, power supplies, ingress/egress ports for substrates, gases, and other materials for developing semiconductor products. Sensors in this context can include gas flow sensors, pressure sensors, metrology-related sensors, and the like. In addition, semiconductor processing tools utilize 'recipes' to orchestrate the production of semiconductor products, utilizing sensors to ensure the tool is operating in conformity with a given recipe.

These systems further include additional systems that support the operation of the tool, such as various pumps, chillers, heaters, abatement systems, and the like, commonly referred to as sub-fab components. These components are typically manufactured to interface to semiconductor processing systems of different manufacturers according to standard physical interfaces that provide control of the component and a limited number of non-control sensor feedbacks. By way of example, a pump sub-fab component may interface to a semiconductor processing system through a cable that may be coupled to a switch, providing control over pump operation speed and data regarding current (e.g., amperes) consumption of the pump.

Although sub-fab components provide some sensor data via their internal sensors regarding their status to the semiconductor processing system, there are issues that arise with these components that impact the processing system and are outside the scope of detection by the internal sensors. As a sub-fab component degrades with use, resulting in an issue for which it has no sensor, the semiconductor processing system is unable to take action as there is insufficient data regarding the issue. As a result, once the issue becomes sufficiently large, the impact on the operation of the semiconductor processing system can be catastrophic, requiring shut-down of the system until the sub-fab component is repaired or replaced.

What is needed are systems and methods to overcome these and other shortcomings.

SUMMARY

The present disclosure relates to systems and methods for detecting anomalies in a semiconductor processing system. According to certain embodiments, one or more external sensors are mounted to a sub-fab component, communicating with the processing system via a communication channel different than the sub-fab component and providing extrinsic sensor data that the sub-fab component is not configured to provide. The extrinsic sensor data may be combined with sensor data from a processing tool of the system and/or intrinsic sensor data of the sub-fab component to form virtual sensor data. In the event the virtual data exceeds or falls below a threshold, an intervention or maintenance signal is dispatched, and in certain embodiments, an intervention or maintenance action is taken by the system.

According to certain embodiments, a system for a semiconductor processing system is disclosed that includes a memory comprising computer-readable instructions and a processor coupled to the memory, the processor configured by the computer-readable instructions to cause the processor to execute a method for detecting anomalies in a semiconductor processing system. The method includes receiving a processing chamber attribute of a substrate processing chamber, receiving sub-fab component external sensor data from a sub-fab component, the sub-fab component being external from the substrate processing chamber, combining the processing chamber attribute and sub-fab component external sensor data to generate virtual sensor data, and generating, based on a determination that the virtual sensor data exceeds a threshold value, a signal indicating an intervention or maintenance action for the sub-fab component.

In certain embodiments, a computer-readable medium computer-readable instructions to perform a method for detecting anomalies in a semiconductor processing system is disclosed. The method includes receiving a processing chamber attribute of a substrate processing chamber, and receiving sub-fab component external sensor data from a sub-fab component, the sub-fab component being external from the substrate processing chamber. The method further includes combining the processing chamber attribute and sub-fab component external sensor to generate virtual sensor data, and generating, based on a determination that the virtual sensor data exceeds a threshold value, a signal indicating an intervention or maintenance action for the sub-fab component.

In certain embodiments, a system for detecting anomalies in a semiconductor processing system is disclosed. The system includes a memory comprising computer-readable instructions, and a processor coupled to the memory, the processor configured by the computer-readable instructions to cause the processor to execute a method for detecting anomalies in a semiconductor processing system. The method includes receiving a processing chamber attribute of a substrate processing chamber, and receive sub-fab component external sensor data from a sub-fab component, the sub-fab component being external from the substrate processing chamber. The method further includes combining the processing chamber attribute and sub-fab component external sensor data to generate virtual sensor data, and generating, based on a determination that the virtual sensor data exceeds a threshold value, a signal indicating an intervention or maintenance action for the substrate processing chamber.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
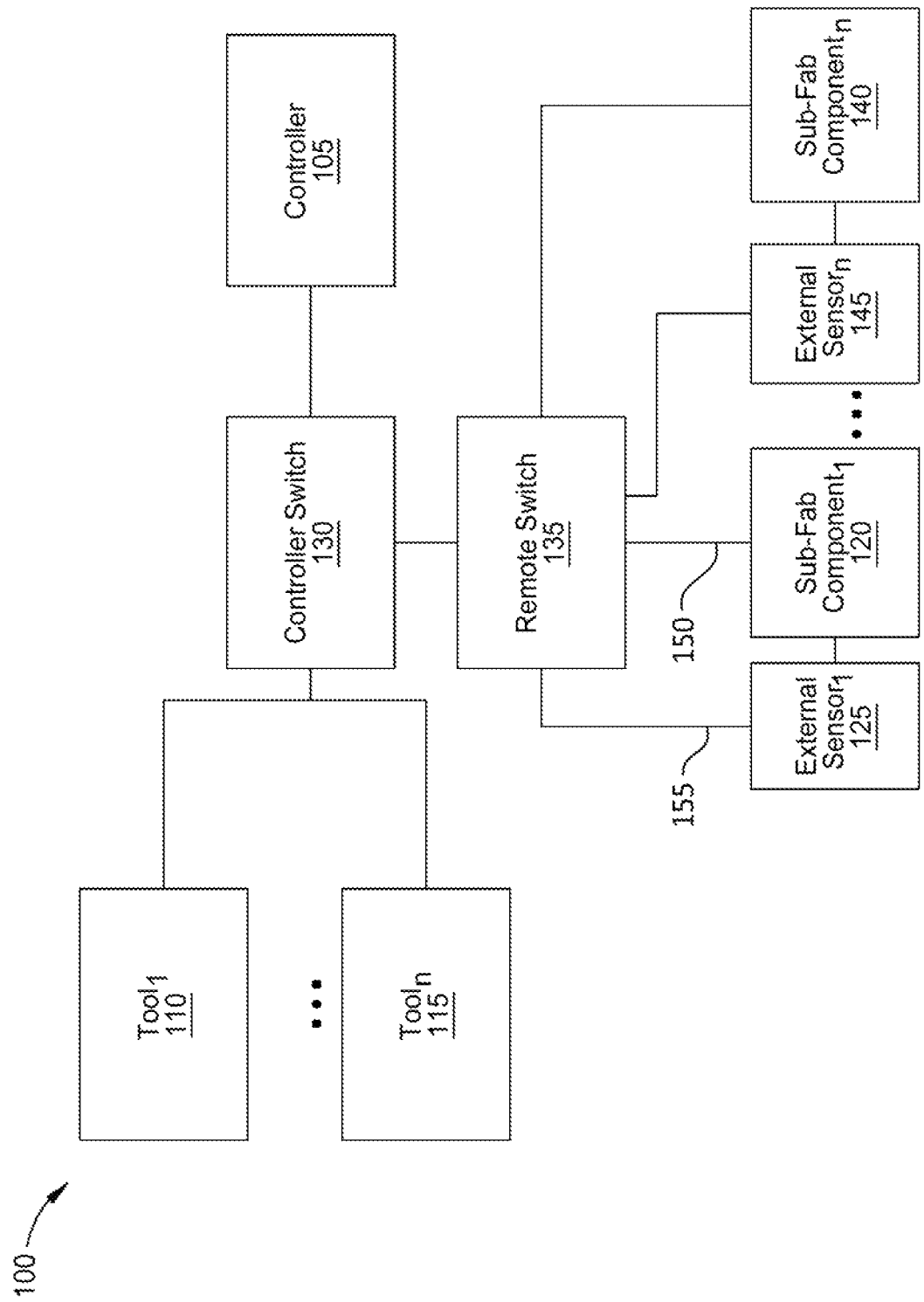
FIG. 1 depicts a block diagram of a system for detecting anomalies in a semiconductor processing system, according to certain embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to systems and methods for detecting anomalies in a semiconductor processing system. According to certain embodiments, one or more external sensors are mounted to a sub-fab component, communicating with the processing system via a communication channel different than a communication channel used by the sub-fab component and providing extrinsic sensor data that the sub-fab component is not configured to provide. The extrinsic sensor data may be combined with sensor data from a processing tool of the system and/or intrinsic sensor data of the sub-fab component to form virtual sensor data. In the event the virtual data exceeds or falls below a threshold, an intervention or maintenance signal is dispatched, and in certain embodiments, an intervention or maintenance action is taken by the system.

According to certain embodiments, a semiconductor processing system includes a semiconductor processing tool coupled to a variety of sub-fab components. In this context, sub-fab components may include, but are not limited to, pumps, heaters, abatement systems, chillers, plasma sources, gas line pre-pump, scrubber, heaters, foreline and exhaust lines, heat exchangers, and the like. Each sub-fab component may have one or more intrinsic sensors provided by the manufacturer of the sub-fab component that communicate with the system via a first communication channel coupled to the system to provide intrinsic sensor data. By way of example, a pump may communicate with the system via the first communication channel so that the system may control the pump during system operation and have an amp sensor as an intrinsic sensor that informs the system of the current draw of the pump. In this example, a complimentary sensor of the tool measures gas flow in the tool as a result of the pump, and the system controls the gas flow in the tool by modifying control signals to the pump.

According to conventional approaches, in the event the pump experiences increasing vibration as a result of a part of the pump becoming defective or worn, this vibration may not be detected by the system as the pump lacks a vibration sensor. According to disclosed embodiments, and by way of example, a vibration sensor is provided with a mounting bracket to allow the vibration sensor to be physically mounted to the pump. The vibration sensor may be coupled to the system via a second communication channel that is different from the first communication channel to provide the system with vibration sensor data regarding the operation of the pump. In this context, a different communication channel means a different physical channel (e.g., cable) or wireless channel than that utilized by the pump. The different channel in this context may be as between the sub-fab component and a controller of the system, or the sub-fab component and an intermediate device, such as a switch, that is coupled to the controller of the system.

In this example, the system has been provided with thresholds regarding the vibration sensor coupled to the pump. These thresholds may be based on historical pump vibration data that indicate when the pump may be vibrating in excess of normal operational parameters. In certain embodiments, pump vibration data may be developed from one or more algorithms. Additionally, threshold data may be additionally based on the semiconductor processing tool, tool parameters, a processing recipe, and/or other sub-fab components that are part of the system.

Further thresholds may be developed by combining vibration sensor data with current data provided by the pump and processing tool sensor data for a virtual sensor that represents the combination of these system elements. In the event the virtual sensor data exceeds a threshold, an intervention or maintenance incident may be provided to a user, and in certain embodiments, the system may take an intervention or maintenance action automatically, for example, shutting down the pump, changing pump speeds, pausing operation of the processing tool, routing substrates for processing to different manufacturing lines, and the like.

Although in the above example, a pump is described, the discussion applies similarly to any sub-fab component capable of having an extrinsic sensor mounted to it in order to provide extrinsic sensor data in addition to intrinsic sensor data from sensors that are part of the sub-fab component as manufactured. According to certain embodiments, an extrinsic sensor in this context will provide data to the system over a different communication channel than an intrinsic sensor. An intrinsic sensor of a sub-fab component is one that is provided with the sub-fab component and communicates over communication channels that the sub-fab component communicates with the system. An extrinsic sensor is coupled, for example, physically mounted via a mounting element to a sub-fab component, or the tool, that communicates with the system over a communication channel that is different from that of the communication channel of the sub-fab component.

By augmenting sub-fab components with extrinsic sensors and providing separate communication channels for the extrinsic sensor to communicate with the system, additional sensor data that was not previously available may be combined with existing data to detect and predict anomalies in a sub-fab component and/or the processing tool. An anomaly in this context may be a maintenance issue, a failure, or other deviation from normal operation.

FIG. 1 depicts a block diagram of a system 100 for detecting anomalies in a semiconductor processing system, according to certain embodiments.

System 100 depicts components of a semiconductor processing system according to certain embodiments. Controller 105 may be a computer system that receives sensor signals from one or more semiconductor processing tools, such as tools 110 through tool$_n$ 115. The controller 105 may be further configured to receive signals from one or more sub-fab components such as sub-fab component$_1$ 120 through sub-fab component$_n$ 140, and one or more external sensors such as an external sensor$_1$ 125 that is an extrinsic sensor to sub-fab component$_1$ 120, and an external sensor$_n$ 145 being an extrinsic sensor to sub-fab component$_n$ 140. The controller 105 may be a single computer system, or multiple computers, comprising one or more processors and/or memories. According to certain embodiments, one or more components of the controller 105 may be located remotely and accessed via a network, while a portion, or entirety, of the controller 105 may be deployed in a distributed computing architecture such as a cloud based computing system, having data security control to prevent unintended sharing of data.

The controller 105 may be coupled to one or more semiconductor processing tools, the sub-fab component$_1$ 120 and the external sensor$_1$ 125 via a controller switch 130. According to certain embodiments, the sub-fab component$_1$ 120 and the external sensor$_1$ 125 may be coupled to the controller switch via a remote switch 135.

Semiconductor processing tools coupled to the controller 105, such as tool$_1$ 110 through tool$_n$ 115, may be any type of semiconductor processing tool that may be coupled to one or more sub-fab components such as sub-fab component$_1$ 120. For example, semiconductor processing tools may include chemical vapor deposition (CVD), physical vapor deposition (PVD), atomic layer deposition (ALD), epitaxy (EPI) type tools, as well as single and multi-chambered (i.e., carousel type tools) versions of these. One or more of tool$_1$ 110 through tool$_n$ 115 may further include other types of processing stations used in the manufacture of semiconductor products, such as cleaning chambers, metrology measurement stations, die singulation, and other pre/post processing manufacturing stations.

Sub-fab component$_1$ 120 though sub-fab component$_n$ 140 may be one of a variety of sub-fab component types. By way of example and not limitation, sub-fab components may include pumps, throttle valves, heaters, chillers, abatement systems, foreline, and exhaust lines, heat exchangers, and remote I/O devices, and other systems configured to be coupled to tools, such as one of tool$_1$ 110 through tool$_n$ 115, to form a semiconductor processing system, such as system 100. FIG. 1 depicts sub-fab components coupled to tools 110 through 115 and controller 105 via one or more switches. It is understood that sub-fab component$_1$ 120 through sub-fab component$_n$ 140 may be physically coupled to at least one of the shown tools for purposes of providing functionality for semiconductor processing. For example, in embodiments where sub-fab component$_1$ 120 is a pump, it is physically connected to a gas port in at least one of tools 110 through 115 to provide for input/exhaust of gases. In embodiments where sub-fab component$_1$ 120 is a heater tape, the heater tape is disposed about an element of a tool. In embodiments where sub-fab component$_1$ 120 is an abatement system, the abatement system is coupled to an exhaust of a tool. For ease of description, physical connections between sub-fab components and tools are not shown.

External sensor$_1$ 125 through external sensor$_n$ 145 are physically coupled to sub-fab component$_1$ 120 through sub-fab component$_n$ 140 respectively, and coupled to the controller 105 for data communications. According to certain embodiments, one or more of these components may be coupled to the controller via one or more switches. An external sensor in this context is a sensor extrinsic to the sub-fab component to which it is coupled, typically providing sensor data that the sub-fab component is unable to provide. External sensor$_1$ 125 may be any type of sensor that may be externally coupled to a sub-fab component either directly or indirectly, and capable of communicating with the controller 105 via a communication channel different from a communication channel utilized by the sub-fab component$_1$ 120. Although the type of external sensor coupled to the sub-fab component may vary depending on the sub-fab component and an attribute to be measured, by way of example, the external sensor could be a vibration sensor, gas flow sensor, pressure sensor, voltage sensor, current sensor, electric field sensor, magnetic field sensor, particulate sensor, or a temperature sensor.

For example, in embodiments where the sub-fab component is a pump, the concomitant external sensor may be a vibration sensor. In this example embodiment, while the pump provides a control interface to the controller for operation of the pump during processing operations and may provide current (i.e., ampere) data to the controller for monitoring pump operations, there may be other data related to the operation of the pump that would provide the controller with data more reflective of the status of the pump. In this example embodiment, the external sensor coupled to the pump may be a vibration sensor that is physically connected to the pump. The external sensor is coupled to the controller via a different communication channel than the pump; a different communication channel in this context may be a different cable from the sensor to the controller, or switch, than the pump, different wireless signal to a switch or controller. In this context, the communication channel of the external sensor is different than that of the sub-fab component because the external sensor has been added to the sub-fab component via a mounting device and thus does not share a common physical (or wireless) channel with the sub-fab component. The sub-fab component in certain embodiments has been manufactured to include its I/O and intrinsic sensor data, which use a first communication channel 150. As a sensor added post-manufacture, the external sensor communicates with the controller on a second communication channel 155 different from the first communication channel 150. Although not explicitly depicted, the other sub-fab components and external sensors, for example the sub-fab component$_n$ 140 and external sensor$_n$ 145 coupled thereto, communicate over separate communication channels.

Figure 2:
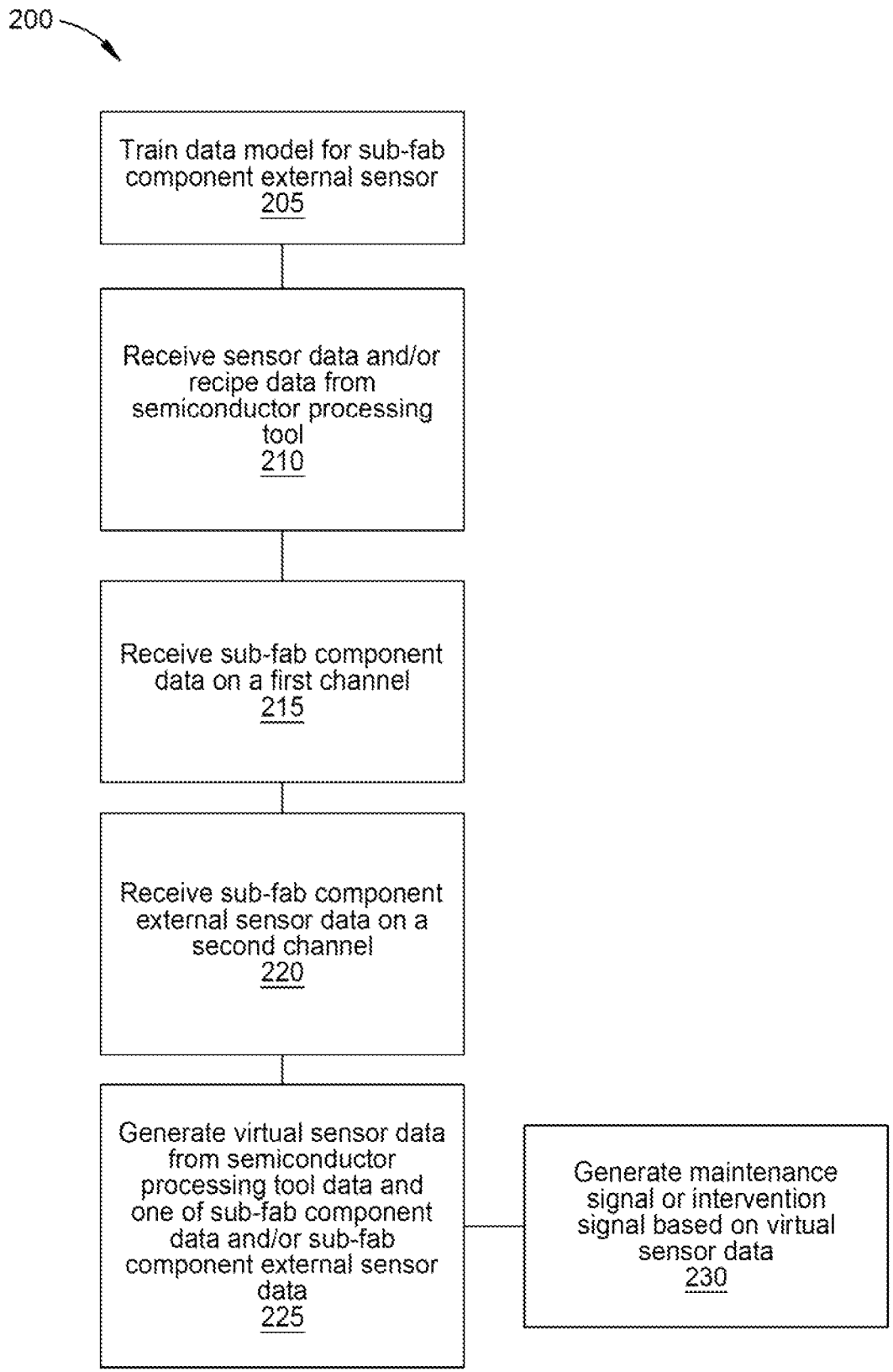
FIG. 2 depicts a flow diagram depicting a method for detecting anomalies in a semiconductor processing system, according to certain embodiments.

FIG. 2 depicts a flow diagram depicting a method 200 for detecting anomalies in a semiconductor processing system, according to certain embodiments.

At operation 205, a data model for a sub-fab component external sensor, such as external sensor$_1$ 125 of FIG. 1, is trained. As discussed above, external sensor$_1$ 125 is physically coupled to sub-fab component$_1$ 120 according to certain embodiments. In certain embodiments that utilize historical data, a data model is trained for external sensor$_1$ 125 by plotting time series historical data of the external sensor$_1$ 125, or similar sensors, coupled to the sub-fab component$_1$ 120, or similar sub-fab components, and placing threshold levels on the plot to show warning and critical levels of external sensor$_1$ 125 data to predict and detect anomalies such as failures of the sub-fab component. According to certain embodiments, historical data chosen to develop the data model may be based on the context of a semiconductor processing system configured with particular components, a semiconductor product processing recipe or recipe type, or a combination of these.

Figure 3:
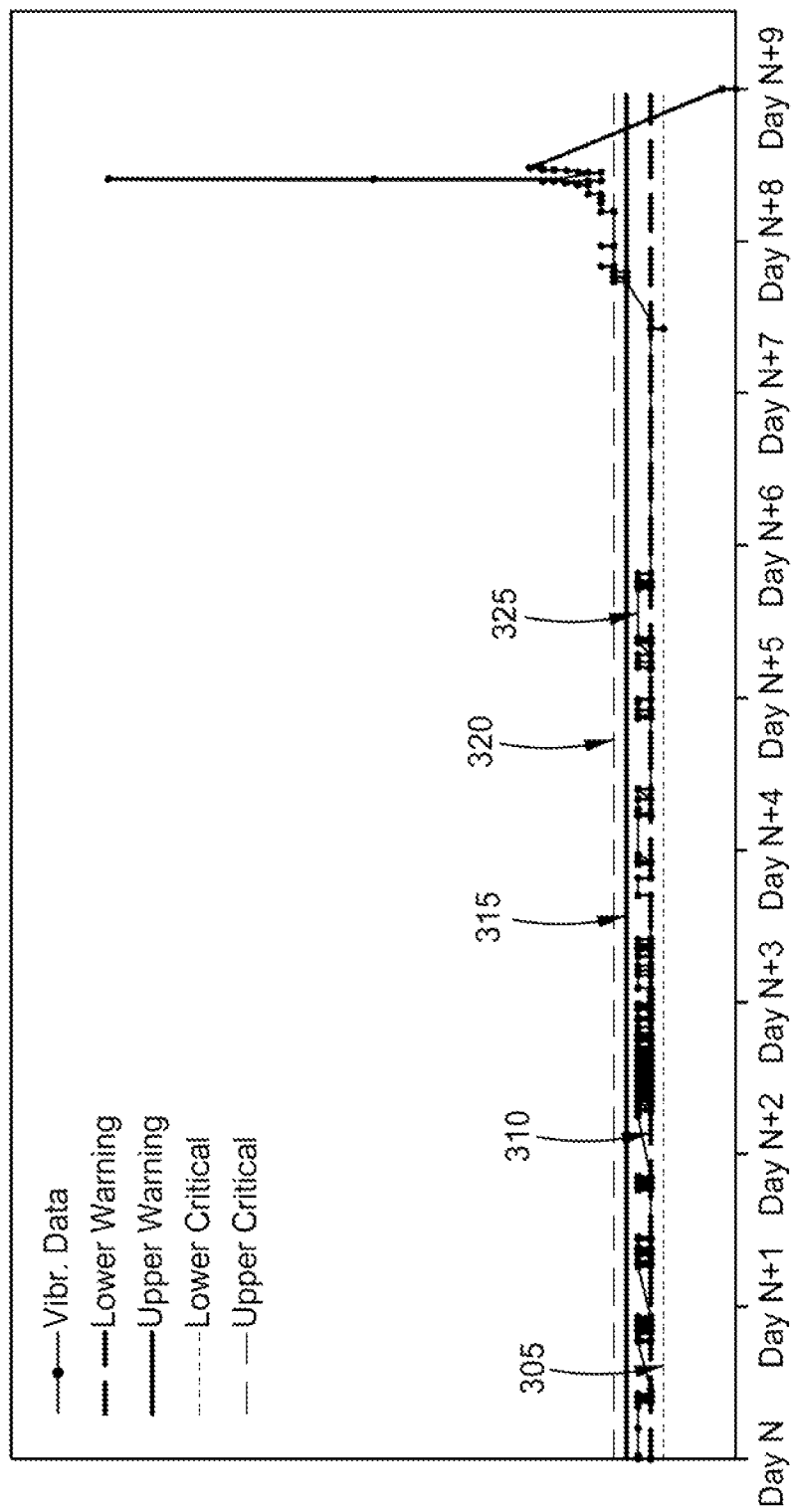
FIG. 3 depicts an example plot of external sensor data for a sub-fab component that is a pump, according to certain embodiments.

By way of example, FIG. 3 depicts an example plot 300 of external sensor data for a sub-fab component that is a pump, according to certain embodiments. External sensor data 325 is plotted on the example plot 300, and thresholds for external sensor data are provided, indicative of the status of the sub-fab component coupled to the external sensor. In the depiction of FIG. 3, external sensor data for a vibration sensor coupled to a pump sub-fab component is provided. A lower critical threshold 305 may indicate that the sub-fab component (e.g., pump) has vibration levels that are too low for normal function, while a lower warning threshold 310 may indicate that the sub-fab component is not operating optimally. An upper warning threshold 315 may indicate that the sub-fab component is not operating optimally, while an upper critical warning threshold 320 may indicate that the sub-fab component may experience imminent failure.

Returning now to FIG. 2, at operation 210 the method 200 includes receiving sensor data and/or recipe data from a semiconductor processing tool, such as one of tools 110 through tool$_n$ 115 of FIG. 1.

At operation 215, the method 200 includes receiving sub-fab component data on a first channel from a sub-fab component. The sub-fab component data may be received from a sub-fab component such as one of sub-fab components 120 through sub-fab component$_n$ 140 of FIG. 1 and received on a first channel such as first communication channel 150. Sub-fab component data in this context may be I/O data for controlling the operation of the sub-fab component. By way of example, in embodiments where the sub-fab component is a pump, I/O data may be related to the operational speed of the pump. Sub-fab component data may further include intrinsic sensor data from the sub-fab component that is provided over the first communication channel that is the same channel for control signals for the sub-fab component. By way of example, this may include current draw (i.e., ampere) data for the example pump.

At operation 220, the method 200 includes receiving sub-fab component external sensor data on a second channel. The sub-fab component external sensor may be the same as external sensor$_1$ 125 of FIG. 1, and the second channel may be the same as the second communication channel 155. The second channel is different from the first channel in that it is not used in sending I/O signals for control of the sub-fab component.

At operation 225, the method 200 generates virtual sensor data. According to certain embodiments, virtual sensor data are generated from data received from the semiconductor processing tool at operation 210, such as sensor data and/or recipe data, and external sensor data received at operation 220, and correlating or combining these data. In other embodiments, virtual sensor data are generated from sub-fab component data received at operation 215 and external sensor data, and correlating or combining these data. In yet further embodiments, virtual sensor data are generated from semiconductor processing tool data, sub-fab component data, and external sensor data, and correlating or combining these data. According to certain embodiments, virtual sensor data may be developed from semiconductor processing tool data, semiconductor processing tool sensor data, sub-fab component data, sub-fab intrinsic sensor data, external sensor data, and/or a combination of these provided to one or more machine learning algorithms such as a neural network, linear regression, logistic regression, support vector machine, k-means clustering, or other supervised or unsupervised machine learning algorithm.

At operation 230, the method 200 generates a maintenance signal or intervention signal based on virtual sensor data. According to certain embodiments, the maintenance or intervention signal may be generated by comparing virtual sensor data to a threshold. In this context, the threshold may be a fixed value, a value based on data from one or more sensors or tools described herein, a machine learning algorithm that provides one or more predictive and/or classification functions based on sensor and/or tool data described herein. Generating a maintenance or intervention signal in this context may include messaging to a user via email, a communications app, an audible alert, visual alert. According to certain embodiments, a maintenance or intervention signal may cause the system to take action in response to the signal, such as by shutting down and/or otherwise modifying the operation of the semiconductor processing tool or a sub-fab component, redirecting processing of substrates from the tool to an alternate tool, modifying the recipe to modify or refrain from carrying out a process impacted as a result of data that caused the virtual sensor to cause the maintenance or intervention signal.

Figure 4:
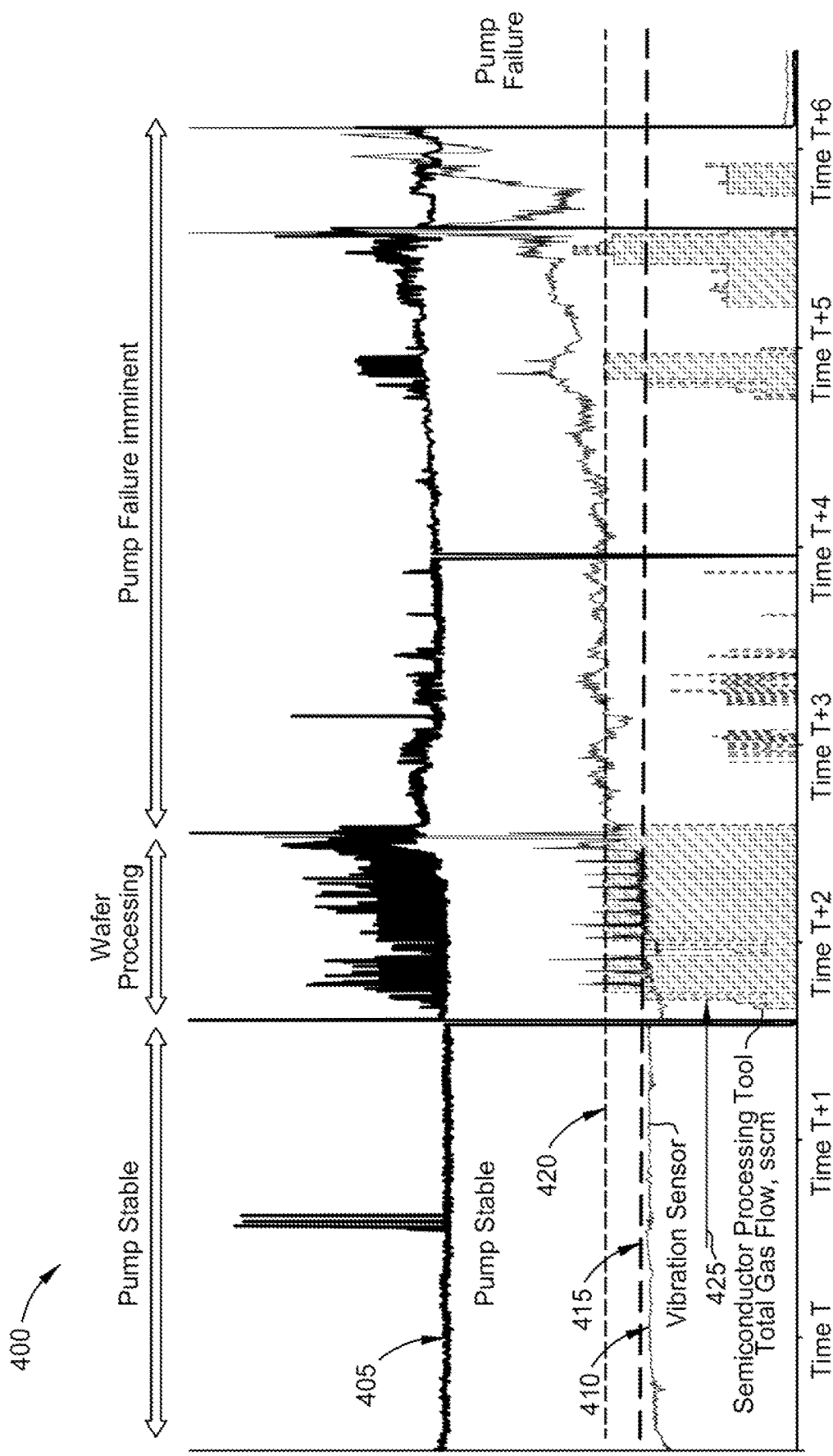
FIG. 4 depicts an example plot of a virtual sensor according to certain embodiments.

FIG. 4 depicts an example plot 400 of a virtual sensor according to certain embodiments. In the shown example, a pump sub-fab component has an internal sensor that includes a current (i.e., ampere) sensor and is coupled to an external sensor that includes a vibration sensor. The semiconductor processing tool includes a gas flow sensor.

The topmost plot, a pump plot 405, shows a reading for an internal sensor of the pump, a current (i.e., ampere) sensor. At time T+2, the current of the pump is shown to vary as a result of the pump operating during a wafer processing cycle. At time T+3 through T+6, the internal sensor shows a few current readings that may be anomalous but are not indicative of a trend that would indicate an anomaly in pump operation. At T+6, the plot shows a catastrophic failure of the pump.

The middle plot, an external sensor plot 410, shows a reading for an external sensor coupled to the pump, in this example, a vibration sensor. The dashed line represents a warning threshold 415, which may be similar to the upper warning threshold 315 of FIG. 3, while the dotted line represents a critical warning threshold 420 that may be similar to the upper critical warning threshold 320 of FIG. 3. According to certain embodiments, the thresholds may be a result of training a data model for the external sensor as described above. As can be seen, as a result of mounting the external sensor to the sub-fab component, the external sensor plot 410 shows that at time T+3 through T+6, the pump vibration is approaching a critical threshold level before failure, which the pump internal sensor did not indicate, and failing at T+6. By receiving advance warning of the critical threshold levels of detected vibration at T+3 (prior to failure), an intervention or maintenance signal may be sent to a user to perform maintenance on the pump or replace the pump before failure of this sub-fab component causes the system to shut down or otherwise fail. In the alternative, a controller of a semiconductor processing system execute an intervention or maintenance action such as decommissioning the pump or altering its operation so that the external sensor doesn't indicate the pump is vibrating at critical levels, changing a processing recipe for a tool coupled to the pump having problem to a recipe/recipe step that doesn't require the use of the pump at critical levels, closing down the tool, rerouting substrates to other semiconductor processing systems within a factory, or other alternative intervention or maintenance actions.

The bottom plot, a sensor plot 425 for the semiconductor processing tool, such as a gas flow sensor, shows gas flow within the tool as a result of operation of the pump. According to certain embodiments, the pump plot 405, the external sensor plot 410, and the sensor plot 425 may be correlated based on a time axis of each plot.

Figure 5:
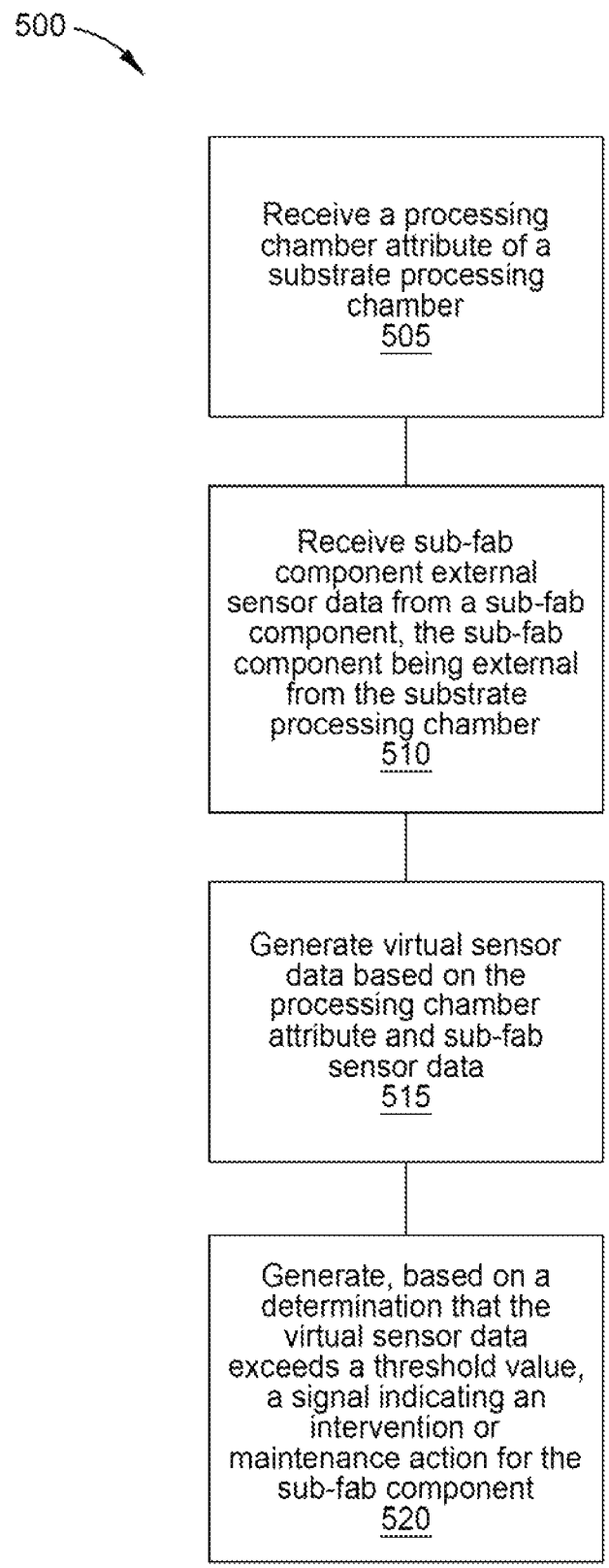
FIG. 5 depicts a method for detecting anomalies in a semiconductor processing system, according to certain embodiments.

FIG. 5 depicts a method 500 for detecting anomalies in a semiconductor processing system, according to certain embodiments. At operation 505, the method 500 includes receiving a processing chamber attribute of a substrate processing chamber. According to certain embodiments, the processing chamber attribute comprises at least one of processing chamber sensor data or processing recipe data. In some embodiments, process recipe data comprises a recipe process operation or a transition between two recipe process operations.

At operation 510, the method 500 includes receiving sub-fab component external sensor data from a sub-fab component, the sub-fab component being external from the substrate processing chamber. According to certain embodiments, the sub-fab component external sensor communicates with the processor of a first communication channel, and a sub-fab component connected to the sub-fab component external sensor communicates with the processor on a second communication channel that is different from the first communication channel. According to certain embodiments, the sub-fab component is one of a pump, a chiller, an abatement assembly, a heater assembly, or a remote I/O; and the sub-fab component external sensor is one of a vibration sensor, a thermal sensor, or a gas flow sensor.

At operation 515, the method 500 generates virtual sensor data based on the processing chamber attribute and sub-fab sensor data. According to certain embodiments, the chamber attribute and virtual sensor data comprise time series data.

At operation 520, the method 500 generates, based on a determination that the virtual sensor data exceeds a threshold value, a signal indicating an intervention or maintenance action for the sub-fab component. According to certain embodiments, the determination that the virtual sensor data exceeds the threshold value further comprises determining that one of the processing chamber attribute and sub-fab component external sensor data exceeds the threshold value.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
a semiconductor processing system comprising a substrate processing chamber, a first communication channel, a pump comprising an intrinsic sensor and an external sensor, the pump being external from the substrate processing chamber;
a memory comprising computer-readable instructions; and
a processor coupled to the memory, the processor configured by the computer-readable instructions to cause the processor to execute a method for detecting anomalies in the semiconductor processing system, the method comprising:
receiving a processing chamber attribute of the substrate processing chamber;
receiving sub-fab sensor data from the pump, wherein receiving the sub-fab sensor data comprises receiving intrinsic sensor data from the intrinsic sensor via the first communication channel and receiving external sensor data from the external sensor via a second communication channel being different from the first communication channel;
generating virtual sensor data based on the processing chamber attribute and the sub-fab sensor data, the virtual sensor data correlating the intrinsic sensor data, the external sensor data, the processing chamber attribute, and a plurality of thresholds along a same time axis, the plurality of thresholds comprising a first threshold that causes generating a warning signal for an intervention action of the pump and a second threshold indicating a failure of the pump; and
performing, based on the virtual sensor data, a maintenance operation of the semiconductor processing system, the maintenance operation comprising decommissioning the pump, altering an operation of the pump, changing a processing recipe for a tool coupled to the pump, closing down the tool, or rerouting a substrate to another semiconductor processing system.

2. The system of claim 1, wherein the processing chamber attribute comprises at least one of processing chamber sensor data or process recipe data.

3. The system of claim 2, wherein process recipe data comprises a recipe process operation or a transition between two recipe process operations.

4. The system of claim 1, wherein the processing chamber attribute and virtual sensor data comprise time series data.

5. The system of claim 4, wherein performing the maintenance operation is based on a determination that the virtual sensor data exceeds a threshold value, comprising determining that one of the processing chamber attribute and pump external sensor data exceeds the threshold value.

6. A non-transitory computer-readable medium having computer-readable instructions to perform a method for detecting anomalies in a semiconductor processing system, the semiconductor processing system comprising a substrate processing chamber, a first communication channel, a pump comprising an intrinsic sensor and an external sensor, the pump being external from the substrate processing chamber, the method comprising:
receiving a processing chamber attribute of the substrate processing chamber;
receiving sub-fab sensor data from the pump, wherein receiving the sub-fab sensor data comprises receiving intrinsic sensor data from the intrinsic sensor via the first communication channel and receiving external sensor data from the external sensor via a second communication channel being different from the first communication channel;
generating virtual sensor data that represents the combination of the processing chamber attribute and the sub-fab sensor, the virtual sensor data correlating the intrinsic sensor data, the external sensor data, the processing chamber attribute, and a plurality of thresholds along a same time axis, the plurality of thresholds comprising a first threshold that causes generating a warning signal for an intervention action of the pump and a second threshold indicating a failure of the pump; and performing, based on the virtual sensor data, a maintenance operation of the semiconductor processing system, the maintenance operation comprising decommissioning the pump, altering an operation of the pump, changing a processing recipe for a tool coupled to the pump, closing down the tool, or rerouting a substrate to another semiconductor processing system.

7. The non-transitory computer-readable medium of claim 6, wherein the processing chamber attribute comprises at least one of processing chamber sensor data or process recipe data.

8. The non-transitory computer-readable medium of claim 7, wherein the process recipe data comprises a recipe process operation or a transition between two recipe process operations.

9. The non-transitory computer-readable medium of claim 6, wherein the processing chamber attribute and virtual sensor data comprise time series data.

10. The non-transitory computer-readable medium of claim 9, wherein the computer-readable instruction causes the method to determine that one of the processing chamber attribute and pump external sensor data exceeds a threshold value.

11. A method for detecting anomalies in a semiconductor processing system, the semiconductor processing system comprising a substrate processing chamber, a first communication channel, a pump comprising an intrinsic sensor and an external sensor, the pump being external from the substrate processing chamber, the method comprising:

receiving a processing chamber attribute of the substrate processing chamber;

receiving sub-fab sensor data from the pump, wherein receiving the sub-fab sensor data comprises receiving intrinsic sensor data from the intrinsic sensor via the first communication channel and receiving external sensor data from the external sensor via a second communication channel being different from the first communication channel;

generating virtual sensor data based on the processing chamber attribute and sub-fab sensor, the virtual sensor data correlating the intrinsic sensor data, the external sensor data, the processing chamber attribute, and a plurality of thresholds along a same time axis, the plurality of thresholds comprising a first threshold that causes generating a warning signal for an intervention action of the pump and a second threshold indicating a failure of the pump; and performing, based on the virtual sensor data, a maintenance operation of the semiconductor processing system, the maintenance operation comprising decommissioning the pump, altering an operation of the pump, changing a processing recipe for a tool coupled to the pump, closing down the tool, or rerouting a substrate to another semiconductor processing system.

12. The method of claim 11, wherein the processing chamber attribute comprises at least one of processing chamber sensor data or process recipe data.

13. The method of claim 11, wherein the processing chamber attribute and virtual sensor data comprise time series data.

14. The method of claim 13, wherein performing the maintenance operation comprises:

determining that one of the processing chamber attribute and pump external sensor data exceeds a threshold value.

* * * * *